Nov. 16, 1965    M. F. BAUER    3,218,094
COUPLING CONNECTION FOR PLASTIC OR SOFT TUBING
Filed Aug. 9, 1963

INVENTOR.
MATTHEW F. BAUER
BY
Woodling, Krost, Granger and Rust

United States Patent Office 3,218,094
Patented Nov. 16, 1965

3,218,094
COUPLING CONNECTION FOR PLASTIC
OR SOFT TUBING
Matthew F. Bauer, 16129 Northvale Blvd.,
Cleveland, Ohio
Filed Aug. 9, 1963, Ser. No. 301,086
2 Claims. (Cl. 285—249)

My invention relates to tube coupling connections for connecting a plastic tube, such as nylon, for example, to a connection body. Although this invention is particularly applicable to plastic tubing of all kinds, it also may be used for soft tubing of other material, including soft ductile metal as well as "Teflon."

An object of this invention is the provision of a tube coupling connection which may be easily assembled and disassembled.

Another object is to provide a fluid seal at a place other than where the sleeve bites into the tube.

Another object is to flare the end of a tube and force the flared end axially into an annular counterbore with a snug fit to plug the counterbore for providing a fluid seal.

Figure 1:
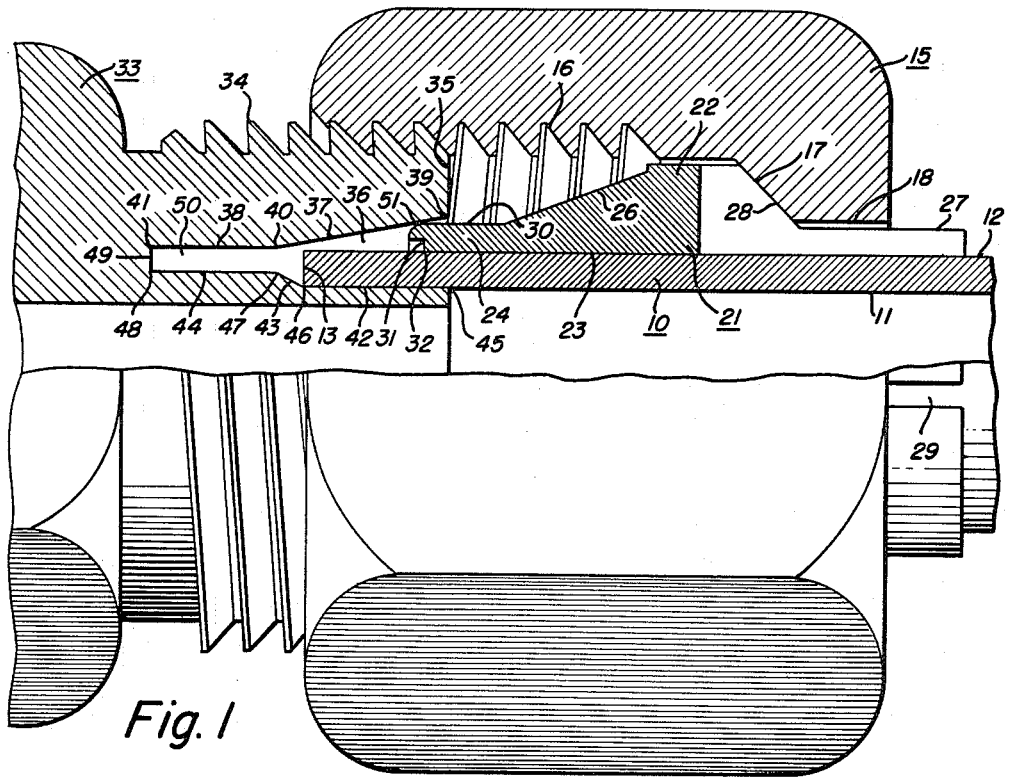
Figure 2:
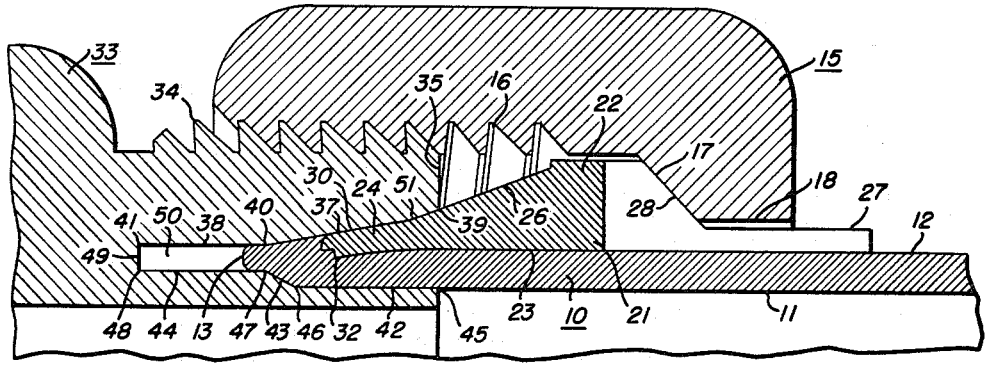

Other objects and a fuller understanding of the invention may be had by referring to the following description and claims, taken in conjunction with the accompanying drawing, in which:

FIGURE 1 is an enlarged side view of a tube coupling connection embodying the features of my invention, the upper part being shown in section to illustrate the relationship of the parts prior to the time that the nut is tightened, the view being approximately eight times scale for a ¼-inch tube; and FIGURE 2 is a view similar to FIGURE 1 but showing the connection in its final assembled condition.

The tube coupling connection may vary in size for tubing ranging from a tube size of one-eighth inch outside diameter to and including a tube size of two inches outside diameter.

With respect to FIGURES 1 and 2 of the drawing, the tube coupling connection comprises generally a tube 10, a connection body 33, a coupling nut 15, and a sleeve 21. The inside surface of the tube is indicated by the reference character 11 and the outside surface of the tube is indicated by the reference character 12. The end of the tube 13 is adapted to extend into the connection body 33.

The coupling nut 15 has female threads 16 which are preferably of the buttress type. The inside surface of the coupling nut 15 is provided with a tapered clamping shoulder 17 which abuts against the sleeve. The right-hand end of the coupling nut 15 is provided with a rearward opening 18.

The sleeve 21 has a central body portion 22 and a bore 23. The sleeve 21 has a forward section and a rearward section. The forward section comprises a contractible end portion 24 and a tapered outer surface 26. The rearward section comprises segmental fingers 27 having a tapered abutment shoulder 28 against which the tapered clamping shoulder 17 of the nut 15 abuts. The segmental fingers 27 have slots 29 therebetween, of which four are illustrated in the drawing although any number of slots may be provided. The outside surface of the contractible end portion 24 is substantially cylindrical and is identified by the reference character 30. The left-hand end of the contractible end portion 24 is provided with a circumferential wall 31 which extends in a generally radially inward direction and terminates in a circumferential biting edge 32 capable of biting into the outside surface of the tube and effecting a driving connection therewith.

The connection body 33 has male threads 34 which are likewise preferably of the buttress type to give additional strength thereto. The right-hand end of the connection body 33 is identified by the reference character 35 and extending inwardly from the right-hand end 35 is a walled chamber 36. The walled chamber 36 terminates inwardly of the connection body 33 and is defined by an outer annular wall and an inner annular wall. The outer annular wall comprises first and second annular wall portions 37 and 38. The first wall portion 37 comprises an inward converging cam wall having a maximum entrance end at 39 and a minimum inward end at 40. The second wall portion 38 comprises substantially an outer cylindrical wall extending axially inwardly of said inward end of said converging wall at 40. The end of the outer cylindrical wall 38 at 40 is identified as an entrance end and defines an outer annular juncture thereat with the minimum inward end of the converging cam wall. The outer cylindrical wall 38 has a terminating end at 41.

The inner annular wall of the counterbore comprises first, second and third annular wall means 42, 43 and 44. The first wall means 42 comprises an extension inner cylindrical wall having an entrance end at 45 and an inward end at 46. The second wall means 43 comprises an inwardly diverging inner wedge wall having a minimum diameter at 46 which defines a first inner annular juncture with the inward end of the extension inner cylindrical wall at 46. The diverging inner wedge wall has a maximum diameter at 47 over which the end of the tube 13 is flared. The third wall means 44 comprises substantially an enlarged inner cylindrical wall having an entrance end at 47 and defines with the maximum diameter of the diverging inner wedge wall a second inner annular juncture. The enlarged inner cylindrical wall has a terminating end 48. Extending between the terminating end 48 and the terminating end 41 of the outer cylindrical wall is a terminating end wall 49. The outer cylindrical wall and the inner cylindrical wall define a counterbore 50 into which the end of the tube 13 is extruded to plug the counterbore 50 for providing a first fluid seal. The converging cam wall and the diverging inner wedge wall slope relative to the longitudinal axis of the connection body and towards each other with said walls defining substantially an annular tapered region therebetween. The angle of the converging cam wall with respect to the longitudinal axis of the connection body may be preferably in the range of 7 to 20 degrees. The angle which the diverging inner wedge wall makes with the longitudinal axis of the connection body may be preferably in the range of 15 to 45 degrees.

The radial distance between the inner and outer cylindrical walls of the counterbore is less than the radial distance between the inside and outside surfaces of an unflared tube. Preferably the radial distance between the inner and outer cylindrical walls of the counterbore lies in a range approximately from 30 to 90 percent of the radial wall thickness of an unflared tube. The radial distance between a minimum and a maximum diameter of the diverging inner wedge wall lies in a range approximately from 20 to 140 percent of the radial wall thickness of an unflared tube. The longitudinal extent of the counterbore is greater than the longitudinal extent of the diverging inner wedge wall. The maximum entrance end at 39 of the converging cam wall and the entrance end 45 of said extension inner cylindrical wall have, respectively, diameters at least equal at the outside diameter 30 of the axial inner end of the contractible end portion 24 of the sleeve 21 and no greater than the diameter of the inside surface of an unflared tube. The converging cam wall at its minimum inward end at 40 has a diameter that is closer to that of the outside surface of an unflared tube than to that of the outside surface 30 of the axial inner end of the contractible end portion 24 of the sleeve. The converging cam wall is axially longer than the diverging inner wedge wall whereby with the unflared tube inserted over the extension inner cylindrical wall and engaging the minimum diameter of the diverging inner wedge wall, the axial inner end of the contractible end portion 24 of the sleeve 21 will engage the converging cam wall at an initial contact place 51 which is axially spaced outwardly from the end of the inserted tube. The converging cam wall between said initial contact place 51 and the minimum inward end thereof at 40 slope to define an acute angle at substantially all places therealong with respect to the longitudial axis of the tube.

In assembly, when the coupling nut 15 is turned with a wrench to tighten same, the tapered clamping shoulder 17 will engage the tapered abutment shoulder 28 of the sleeve 21 and force the outside surface of the contractible end portion 24 of the sleeve against the converging cam wall and thereby cam the circumferential biting edge 32 of the sleeve into the tube, which is supported on the extension inner cylindrical wall, with the biting edge engaging said tube axially outwardly of the end of the tube and thereby providing a driving connection therewith. The extension inner cylindrical wall supports the tube in opposition to the clamping force and enables the driving connection to force the end of the tube over the diverging inner wedge wall and cause said diverging inner wedge wall to flare the end of the tube. The driving connection forces the end of the flared tube axially into said annular cylindrical counterbore with a snug fit to plug the counterbore for providing a first fluid seal means. The extent to which the end of the tube is extruded into the counterbore depends to a certain degree upon the hardness of the tube and the wall thickness of the tube relative to the radial distance across the counterbore. The coupling nut 15 drives the sleeve 21 together with the tube 10 through said driving connection as a unit inwardly of the annular walled chamber 36, with the sleeve 21 wedging itself between the outside surface 12 of the supported tube and the converging cam wall to provide a second annular fluid seal means, including an inner fluid seal between the circumferential biting edge 32 of the sleeve and the outside surface 12 of the tube, and an outer fluid seal between the outside surface 30 of the contractible end portion 24 of said sleeve and said converging cam wall. The turning of the coupling nut 15 is arrested, or at least the turning torque becomes greater, when the tapered outer surface 26 engages the entrance end of the converging cam wall at 39. This tends to limit the extent to which the sleeve and tube as a unit may be forced into the walled chamber.

In this invention, the first fluid seal means, which is provided by extruding the end of the tube into the counterbore, is at a place other than the second fluid seal means where the contractible end portion of the sleeve bites into the tube. With plastic tubing, which is of a flowable nature (the same thing being true of soft metal, which is of a malleable nature), it is preferable to have a fluid seal which is at a place other than where the biting of the sleeve takes place, because where the bite takes place the plastic or soft metal may tend to flow under the biting pressure and thereby lose the effective seal. In this invention, the seal where the end of the tube is extruded into the counterbore maintains itself without flowing to the extent of jeopardizing the seal.

The present disclosure includes that contained in the appended claims as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:
1. A coupling connection between a connection body and a tube having an inside and an outside annular surface, a sleeve having a bore with said tube extending therethrough, said sleeve comprising a continuous hollow body having at least first and second integral hollow body portions, said first hollow body portion comprising a continuous substantially cylindrical body constituting a contractible end portion beyond which the end of said tube extends, said contractible end portion of said sleeve having a substantially cylindrical inside and outside surface and a circumferential wall extending in a generally radially inward direction and terminating in a continuous circumferential biting edge at the axial inner end portion of the sleeve capable of biting into the outside surface of said tube and effecting a driving connection therewith, said second hollow body portion comprising a continuous substantially diverging hollow wedge body with a substantially cylindrical inside surface and a substantially tapering outside surface, said substantially tapering outside surface of said second hollow body portion converging toward said substantially cylindrical outside surface of said contractible end portion and meeting therewith and defining a circular juncture therebetween, said connection body having an axially directed inwardly extending annular walled chamber, said chamber terminating inwardly of said connection body and defined by an outer annular wall and an inner annular wall, said outer annular wall comprising first and second annular wall portions, said first wall portion comprising an inwardly converging cam wall having a maximum entrance end and a minimum inward end, said second wall portion comprising substantially an outer surface wall extending axially inwardly from said inward end of said converging cam wall, said outer surface wall having an entrance end and an inward terminating end with said entrance end defining an outer annular jucture with said minimum inward end of said converging cam wall, said inner annular wall comprising first, second and third annular wall means, said first wall means comprising an extension inner surface wall having an entrance end and an inward end, said second wall means comprising an inwardly diverging inner wedge wall having a minimum diameter and a maximum diameter with said minimum diameter defining with said inward end of said extension inner surface wall a first inner annular juncture, said third wall means comprising substantially an enlarged inner surface wall having an entrance end and an inward terminating end with said entrance end defining with said maximum diameter of said diverging wall a second inner annular juncture, said second inner annular juncture and said outer annular juncture being substantially axially coextensive with each other, terminating wall means extending between said inward terminating end of said outer surface wall and said inward terminating end of said enlarged inner surface wall, said converging cam wall and said diverging wedge wall sloping relative to the longitudinal axis of said connection body and toward each other with said walls defining substantially an annular tapered region therebetween, said outer surface wall and said enlarged inner surface wall defining an annular counterbore having a radial distance between said surface walls which is less than the radial distance between the inside and outside surfaces of an unflared tube, said maximum entrance end of said converging cam wall and the entrance end of said extension inner surface wall having respective diameters at least equal to the outside diameter of the axial inner end of said contractible end portion of said sleeve and no greater than the diameter of the inside surface of an unflared tube, said converging cam wall at said minimum inward end having a diameter that is closer to that of the outside surface of an unflared tube than to that of the outside surface of the axial inner end of said contractible end portion of said sleeve, said converging cam wall being axially longer than said diverging wedge wall whereby with said unflared tube inserted over said extension inner cylindrical wall and engaging the minimum diameter of said diverging wedge wall said axial inner end of said contractible end portion of said sleeve will engage said converging cam wall at an initial contact place axially spaced outwardly from the end of said tube, said converging cam wall between said initial contact place and said minimum inward end thereof sloping to define an acute angle at substantially all places therealong with respect to the longitudinal axis of the tube, force means engaging said sleeve axially outwardly of said biting edge for forcing the outside surface of said contractible end portion of said sleeve against said converging cam wall and camming the circumferential biting edge of said sleeve into said tube supported on said extension inner cylindrical wall with said biting edge engaging said tube axially outwardly of the end of said tube and thereby providing a driving connection therewith, said extension inner surface wall supporting said tube in opposition to said clamping force and enabling said driving connection to force the end portion of said tube over said diverging wedge wall and cause said diverging wedge wall to flare the end portion of said tube, said driving connection forcing the end of the flared tube axially into said annular counterbore with a snug fit to plug said counterbore for providing an end plug fluid seal means, said force means driving said sleeve together with said tube through said driving connection as a unit in a direction inwardly of said annular walled chamber with said substantially cylindrical outside surface of said contractible end portion of said sleeve wedging itself between said supported tube and said converging cam wall and with said substantially tapering outside surface of said substantially diverging wedge body engaging said converging cam wall, said contractible end portion of said sleeve upon wedging itself between said supported tube and said converging cam wall providing a sleeve, annular fluid seal means including an inner fluid seal between the continuous circumferential biting edge of said sleeve and the outside surface of said tube and an outer fluid seal between the outside surface of said contractible end portion of said sleeve and said converging cam wall, said substantially tapering outside surface of said substantially diverging wedge body upon engaging said converging cam wall effecting a wedge annular fluid seal means therebetween and also limiting the extent to which said contractible end portion of said sleeve may wedge itself between said supported tube and said converging cam wall and thereby arresting the axial inner end of said contractible end portion of said sleeve at a place in advance of said outer annular juncture between said converging cam wall and said entrance end of said outer surface of said second wall portion.

2. The structure of claim 1, and in which said outer and inner surface walls are substantially cylindrical.

References Cited by the Examiner
UNITED STATES PATENTS

| | | | |
|---|---|---|---|
| 2,365,747 | 12/1944 | Cowles | 285—249 |
| 2,850,303 | 9/1958 | Bauer | 285—342 X |
| 2,946,607 | 7/1960 | Bauer | 285—382.7 |
| 2,951,715 | 9/1960 | Bauer | 285—249 |
| 3,158,388 | 11/1964 | Marshall | 285—259 X |

CARL W. TOMLIN, *Primary Examiner.*